(12) United States Patent
van der Lely (10) Patent No.: US 7,082,740 B2
(45) Date of Patent: Aug. 1, 2006

(54) DEVICE AND METHOD FOR WRAPPING BODIES, ESPECIALLY BALES OF HARVESTED AGRICULTURAL PRODUCE

(75) Inventor: Olaf van der Lely, Zug (CH)

(73) Assignee: Lely Research Holding A.G. A Swiss Limited Liability Co., Zug (CH)

( * ) Notice: Subject to any disclaimer, the term of this patent is extended or adjusted under 35 U.S.C. 154(b) by 0 days.

(21) Appl. No.: 09/873,337

(22) Filed: Jun. 5, 2001

(65) Prior Publication Data

US 2002/0124529 A1 Sep. 12, 2002

Related U.S. Application Data

(63) Continuation of application No. PCT/NL00/00619, filed on Sep. 4, 2000.

(30) Foreign Application Priority Data

Oct. 5, 1999 (EP) .................................. 99203251

(51) Int. Cl.
  *B65B 61/02* (2006.01)
  *B65B 61/26* (2006.01)

(52) U.S. Cl. ...................... 53/411; 53/135.1; 53/135.3; 53/556

(58) Field of Classification Search .................. 53/411, 53/556, 176, 135.3, 172, 135.1; 156/443, 156/446, 468, 475, 486, 540, 541
See application file for complete search history.

(56) References Cited

U.S. PATENT DOCUMENTS

| 4,144,696 | A | * | 3/1979 | Gustavsson | 53/442 |
| 4,248,031 | A | * | 2/1981 | Del Pozo, Jr. | 53/556 |
| 4,723,393 | A | * | 2/1988 | Silbernagel | 53/556 |
| 4,927,486 | A | * | 5/1990 | Fattal et al. | 156/351 |
| 5,024,718 | A | * | 6/1991 | Hannen | 156/475 |
| 5,189,866 | A | * | 3/1993 | Krutza | 53/587 |
| 5,471,919 | A | * | 12/1995 | Dabizzi | 100/7 |
| 6,370,839 | B1 | * | 4/2002 | Nakagawa et al. | 53/64 |
| 6,393,808 | B1 | * | 5/2002 | Kallner et al. | 53/556 |

* cited by examiner

*Primary Examiner*—Scott A. Smith
*Assistant Examiner*—Gloria R Weeks
(74) *Attorney, Agent, or Firm*—Penrose Lucas Albright (57) ABSTRACT

A device for wrapping bales of agricultural produce such as bales of hay, straw or green crop with a film. The bales are completely wrapped with the film and are marked to set forth the quality of the bale as silage and with further information. The information may include the amount of film used to wrap the bale and thus the number of wrapping layers, and the name of the person responsible for wrapping the bale. Electronic devices may be applied to the wrapping film for ascertaining the location of the bale after it has been wrapped by GPS or DGPS. The information can be imprinted directly on the film used for wrapping the bale or on labels applied to the film.

17 Claims, 6 Drawing Sheets

DEVICE AND METHOD FOR WRAPPING BODIES, ESPECIALLY BALES OF HARVESTED AGRICULTURAL PRODUCE

RELATED APPLICATION

This is a Continuation of International PCT/NL00/00619, filed Sep. 4, 2000.

FIELD OF INVENTION

The invention relates to a device for wrapping bodies, especially bales of harvested agricultural produce from hay, straw or wilting green crop with a film.

The invention furthermore relates to a method for wrapping bodies, especially bales of harvested agricultural produce from hay, stray or wiling green crop, with a film in the above mentioned device.

BACKGROUND OF THE INVENTION

Wrapping bales of fresh or wilting grass with a ductile and adhesive film is currently growing more and more popular because the tightly wrapped bales—apart from other advantages—mature into silage within the film wrap in a relative short period of time without releasing silage fluid that damages the environment, as is the case with clamp silos or silage towers.

Both round and rectangular bales can be wrapped. Currently basically two bale wrapping systems have been introduced into practice. In the case of the so-called wrapping table system, subsequent covering layers of film are placed two to three times around the entire outer bale circumference during the rotation of the bale around a horizontal axis and simultaneous rotation around a vertical axis. In the case of the so-called rotary arm system, the bale is also placed on a type of wrapping table that rotates the bale around its horizontal longitudinal axis, however the wrapping table does not simultaneously rotate around its vertical axis but instead the relative rotation between the bale and the dispensing reel is generated by a rotary arm that circles the bale and holds the film reel at its outermost end.

The silage quality depends on the bale quality of the film wrap on the other hand.

Type, age and wilting degree of the harvested agricultural produce as well as swath preparation and pre-treatment of the harvested agricultural produce (cut or uncut) plus particularly the bale pressing density and shape largely determine the bale quality. Bales with a higher pressing density contain a lower portion of air so that within the wrapped bale better silage quality can be achieved.

The quality of the film wrap is determined by the quality of the film, i.e. the manufacturing process (drawn or blown), film thickness, film coloration (white, black, green), tear strength, adhesive force as well as gas permeability and especially also the care of the operator, i.e. exact adjustment of the pre-stretching process of the film, even film overlapping and correct number of layers as well as careful bale storage.

A high degree of silage quality can be achieved if all abovementioned conditions are met.

With combinations of round balers and devices for wrapping the bales have been introduced recently, it depends on the care of a single person on whether or not a high-quality silage is obtained.

SUMMARY OF THE INVENTION

The invention relates to ensuring that the quality of the produced bale silage is recorded for further processing, particularly in the case of feed for high-yielding animals, thus allowing it to be traced back.

This requirement is resolved with regard to the device by providing means for attaching an identification such as a label or a print on, at, in or below the film covering the bale.

With regard to the method, the requirement is met in that the means for attaching an identification are controlled based on the extent the bale is wrapped by the film.

Based on the invented device or the invented method or both, with appropriate information, for example, origin, quality, pressing or wrapping date, or both, as well as, in particular, the worker or farmer who performed the pressing and wrapping processes can be recognized and traced back at any time. When making the attachment of identifying information dependent upon adherence to previously established requirements during the production of the silage, it can serve as a certification mark for consistent quality assurance across the entire production process of the bale silage and also, for example, as a basis for invoicing when marketed because it offers an advertising effect for the equipment or companies or both that were involved in its production.

In a beneficial embodiment, the identifying information is a self-adhesive label, for example, consisting of a printed film, which is arranged on a label tape.

In another embodiment, the means comprise a labeling dispensing unit and a pressing element. Conventional label dispensing units ensure a simple feeding process of a label in which a label tape is pulled around a pull-off edge, thus detaching the label and attaching it to and pressing it onto the film wrap of the bale with a pressing element.

Detaching the label from the label tape can be done automatically by the rotating bale or also with the help of mechanical, electric, hydraulic, pneumatic, auxiliary drives or with a drive source on the tractor, or any appropriate combination thereof.

In another embodiment of the invention, means are provided for imprinting the individual labels separately. Consistent parameters, e.g. the pressed product, are pre-printed onto the label, while changing parameters such as the operator information or the wrapping data are printed individually before or while attaching the self-adhesive labels, mechanically or electronically, upon appropriate input from the operator or based on the bale. If necessary, the operator can confirm the excellent work at the end by including his signature on the label of a bale.

Generally it is feasible to control the means for attaching identifying information based on the extent that the bale is wrapped with the film. The attached self-adhesive label is attached just before, during or just after completion of the wrapping process. In this case of white or nearly transparent films, a non-adhesive label can be placed beneath one of the last film layers where it will still be visible despite being covered by the film.

Identifying information to be applied can include, for example, round or rectangular pre-printed or blank self-adhesive labels or also label tapes or self-adhesive, imprinted film tapes, which are perforated at regular intervals or separated into sections with a cutting device. Similarly, the identification can include electronically captured data in order pick the silage bales, for example, up from the ground with an automated handling system, transport them or process them. So-called 'smart labels' are also feasible, which represent very thin electronic transponders, i.e. transmit-receive devices with microchip and antenna, which are applied to the film.

Additional useful embodiments of the invention will be appreciated from the subsequent description of several embodiments of the invention based on the following drawings.

DETAILED DESCRIPTION OF THE PREFERRED EMBODIMENTS

Figure 1:
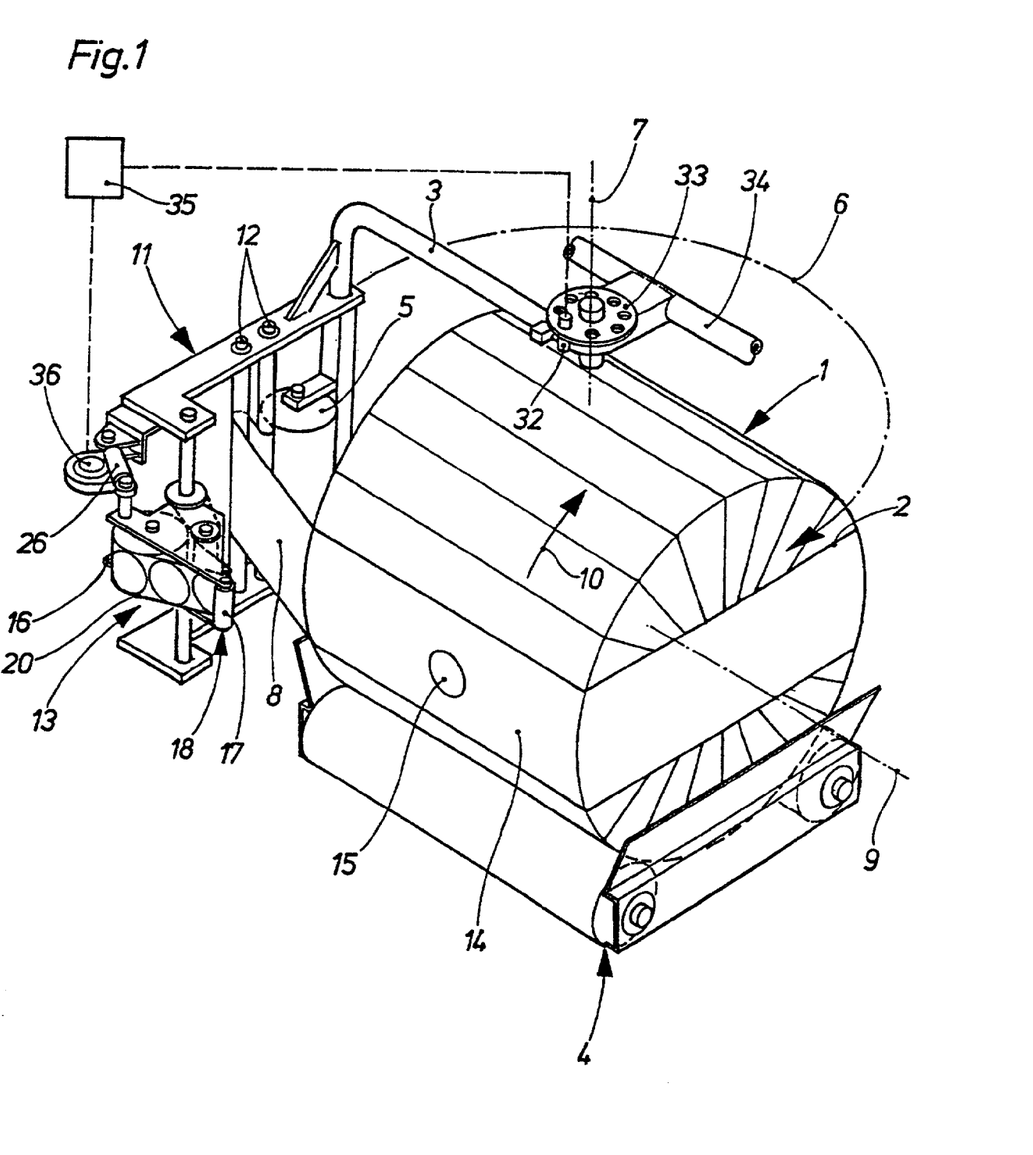
FIG. 1 shows a first device for identifying a bale wrapped in film with a rotary arm wrapping device in a perspective diagrammatic view wherein the rotary arm has attached a label on the bale.

The device shown in FIG. 1 for wrapping a bale 1 of harvested agricultural produce with a ductile and self-adhesive film 2 is an embodiment with a rotary arm 3 and a stationary wrapping table 4 for holding bale 1 of harvested agricultural produce, as is basically described in EP 0 234 763 A1. On its outer, lower end, rotary ram 3 carries a film dispensing reel 5, which is guided around a vertical axis 6 around bale 1 of harvested agricultural produce during the wrapping process in a rotational movement, wherein a strip of film 8 is pulled off of film dispensing reel 5 and wound around bale 1 of harvested agricultural produce, which is turning around a horizontal rotational axis 9 in the rotational direction 10. As shown in FIG. 1 the entire outer bale circumference has been wrapped, for example, twice with overlapping strips of film so that the wrapping process is just before completion, for which a cutting-and-clamping device (not shown) cuts strip of film 8 in the free area between bale 1 and rotary arm 3 and holds it in place with a clamping process for wrapping another bale 1.

As furthermore shown in FIG. 1, a film stretching device 11 is arranged in the path of travel of strip of film 8 dispensing reel 5 and bale 1 of harvested agricultural produce, wherein this device 11 includes at least two stretch rollers 12 that are arranged vertically. Film stretching device 11 is fastened to rotary arm 3 with dispensing reel 5 as one modular unit.

According to the invention, the film stretching device 11 is followed by a device 13 for identifying a film section 14 on bale 1 of harvested agricultural produce with a label 15 or a print. In a simple design version, this means a label dispensing unit 16 with a pressing roller 17 that can be activated and brought into an operating position from a resting position 18 away from bale 1, wherein a label 15 is attached to a previously set position on the film surface and pressed on. Bale 1 or the film surface or both form a counter-force in this case when pressing on label 15. FIG. 1 shows bale 1 of harvested agricultural produce with an attached label 15.

Figure 2:
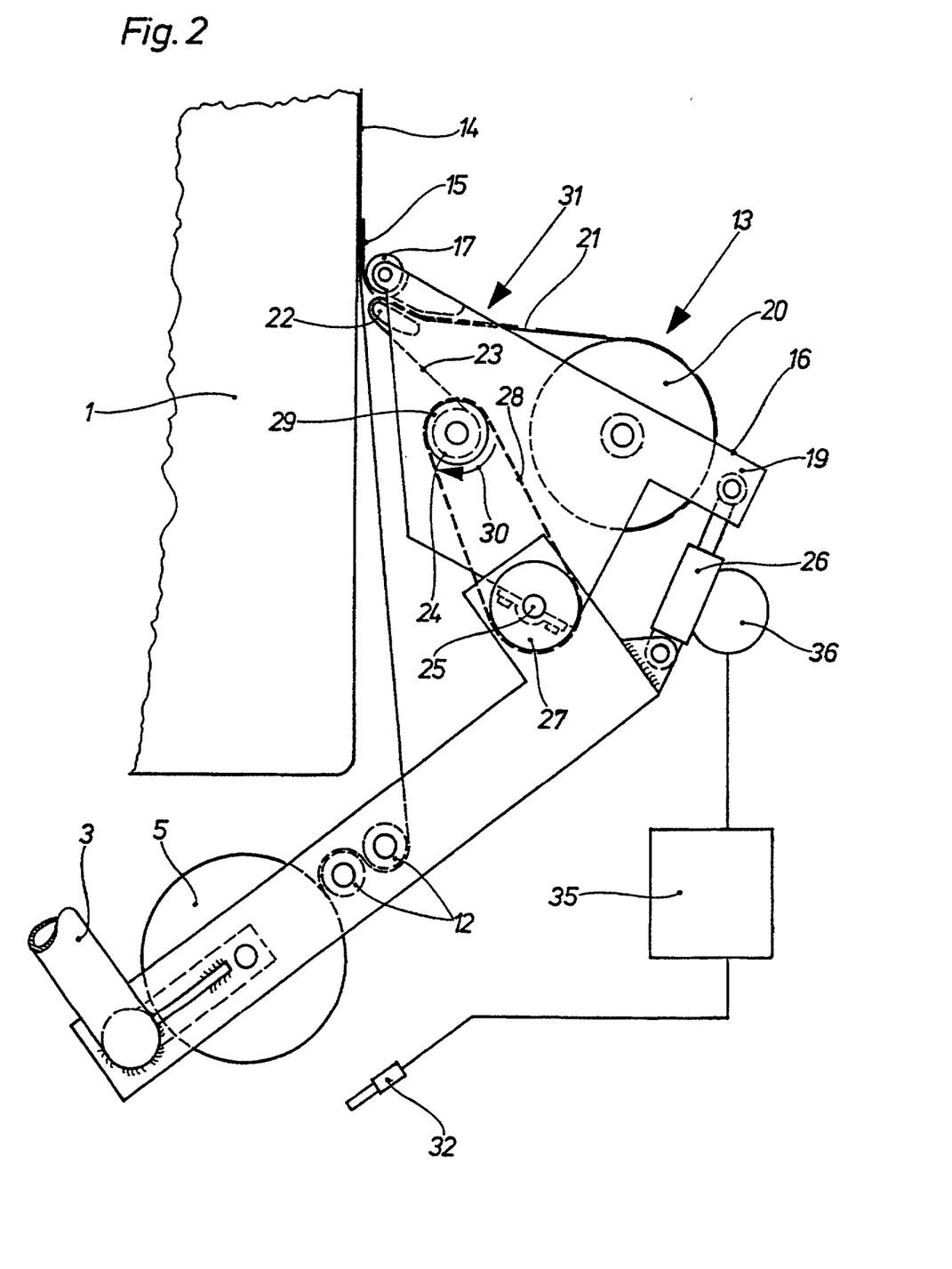
FIG. 2 discloses the label dispensing unit of FIG. 1 in enlarged view while pressing a label onto the film that surrounds the bale with a pressing roller.

Label dispensing unit 16 and the attaching process to bale 1 can best be viewed in FIG. 2. Label dispensing unit 16 is equipped with a label dispensing reel 20 that can rotate within a housing 19 and consists of a label tape 21 that is wound onto a reel core (not shown). For the purpose of dispensing a label 15, label tape 21 is pulled around a pull-off edge 22 through a drive device, thus detaching a label 15, feeding it to a pressing element 17, attaching it on the object that is to be identified, and pressing it on. The empty tape 24 is wound onto a take-up roller 24. Hand-held labeling devices of this kind are described, for example, in EP 0 810 155 B1. These devices, however, are not suitable for applying labels automatically in the case of wrapping devices for bales.

As shown in FIG. 1 and FIG. 2, label dispensing unit 16 is seated in an articulating manner in the horizontal plane on a shaft 25, which is also fastened to the modular unit, parallel and at a distance to stretch rollers 12. Label dispensing unit 16 can also be arranged on shaft 25 in such a manner so that its height can be adjusted in order to establish the application area or label 15 on the film surface. The articulating feature is caused by a hydraulic piston and cylinder unit 26, which is arranged on the modular unit on the one hand and label dispensing on the other hand. Furthermore a chain sprocket 27 is arranged on shaft 25, which through a chain 28 or belt drive is connected with a chain sprocket 29 that drives take-up roller 24 for label tape 21 when swiveling label dispensing unit 16 in the rotational direction 30 and thus pulling label tape 21 from label dispensing reel 20 around pull-off edge 22 for a certain distance—thus detaching label 15 from tape 23, attaching it to film surface, as shown in the working position 31 of label dispensing unit 16 in FIG. 2, and running pressing roller 17 over it while rotating rotary arm 3 in rotational direction 6 so that it is firmly attached to film 2. For the purpose of controlling label dispensing unit 16, a sensor 31 is provided, which is arranged in a coaxial manner relative to axis 7 on a master hole gage 33, which in turn is connected firmly with the stand 34 for the rotary arm seating. The position of sensor 32 can be varied either by turning master hole gage 33 or by inserting it into different hole patterns. Additionally, sensor 32 serves as cyclometer for rotary arm 3 and is connected with an electronic control and evaluation unit 35. Through appropriate angular positions, sensor 32 can on the one hand effect signals for triggering a cutting-and-clamping device (not shown), but on the other hand particularly by triggering a signal for the drive of label dispensing unit 16 when rotary arm 3 passes sensor 32 before the location where label 15 is to be attached. Control and evaluation unit 35 works together with a control valve 36 of hydraulic piston and cylinder unit 26 in order to effect the motion of label dispensing unit 16 from its resting position 18 in accordance with FIG. 1 into the operating position shown in FIG. 2.

Activation of label dispensing unit 16 is thus pre-set by control and evaluation unit 35 or on the rotary arm sensor, or both, in such a way that a label 15 is attached in the desired location, e.g. in the center of the film width and in the horizontal longitudinal median plane of bale 1, as shown in FIG. 1, wherein the cutting-and-clamping process follows immediately thereafter without covering label 15 with another layer of film. The areas in which label 15 is attached also depends on how bale 1 will be stored, i.e. on the front or circumference side. Visibility of label 15 should be ensured. The advantage of the above solution is particularly that no additional drive devices are required because the already existing rotary motion of rotary arm 3 is utilized to dispense a label 15 and roll pressing roller 17 over that label 15, and thus press it onto the bale. In this embodiment, for example, a round pre-printed self-adhesive label with the name of the press manufacturer is used. The size can be about ¹⁄₁₀th of the bale diameter. Of course, any other label designs can be utilized. The label can also include a text area for signature of the machine operator. In label dispensing unit 16, a printing device can also be arranged for imprinting label 15 before dispensing it from the unit, e.g. in order to imprint the wrapping date or bale weight or both onto label 15 through appropriate sensors and signal transmitters. Similarly, electronic signal transmitters or receivers like transponders or other data can also be stored on the labels.

Figure 3:
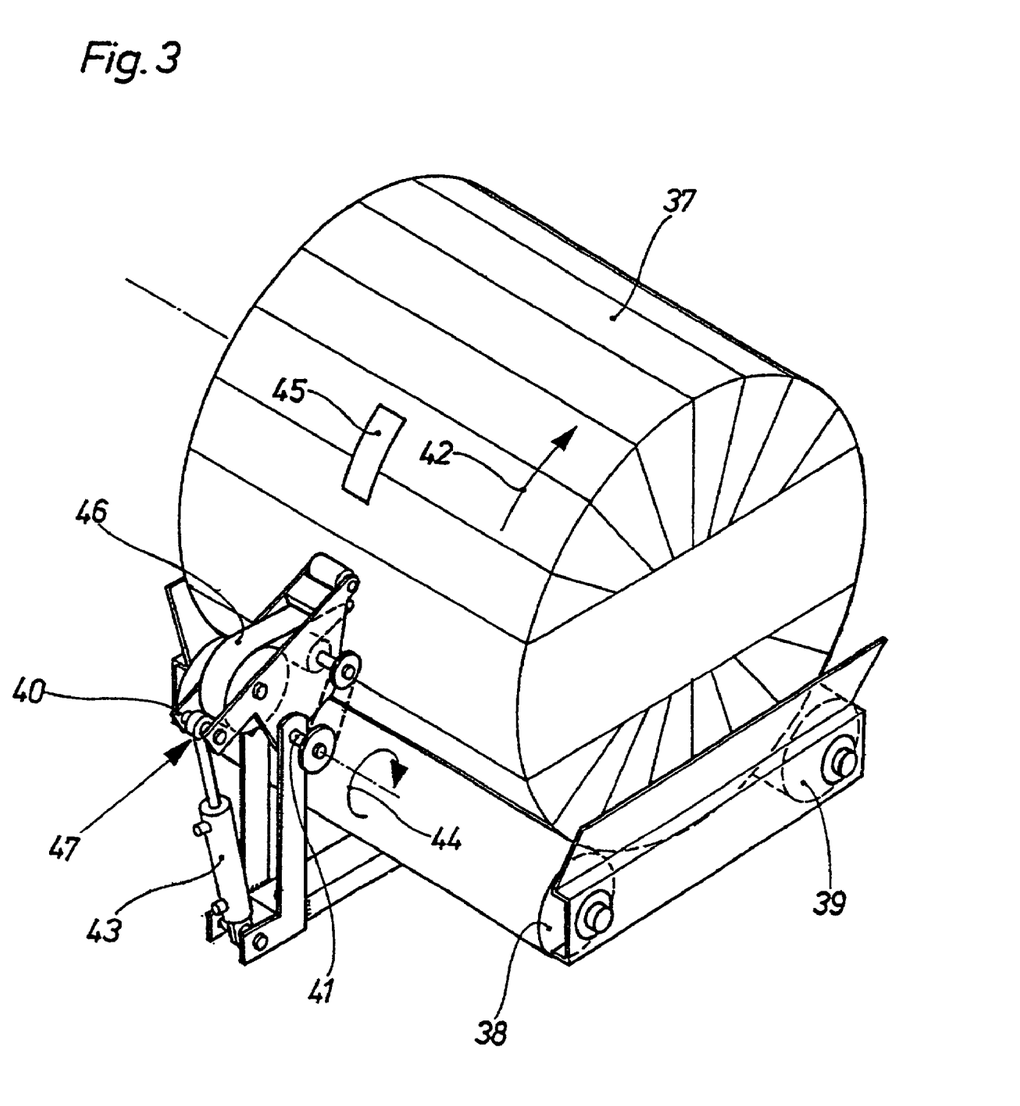
FIG. 3 shows a second device for identifying a bale wrapped with a film in a perspective diagrammatic view.

The embodiment, in accordance with FIG. 3, only shows a bale 37 on two wrapping rollers 38 and 39 units in its resting position and wrapped overall with the film. A label dispensing unit 40, in accordance with FIG. 2, is arranged in an articulating manner roughly in the center of the bale width on a stationary support shaft 41 that is arranged parallel to wrapping rollers 38 and 39. During bale rotation in the direction marked with the arrow 42, label dispensing unit 40 is pressed around the shaft 41 in the direction 44 against the film surface by extending a hydraulic piston and cylinder device 43, which causes rotating bale 37 to attach a label strip 45 automatically on its own. The pulled label tape 46 issues a signal when the label has been completely pulled off, thus causing the automatic return of label dispensing unit 40, for example, through the force of a spring element, into the resting position shown in FIG. 3. Alternatively it is also feasible to stop the bale and move the label dispensing unit along the film surface.

Figure 4:
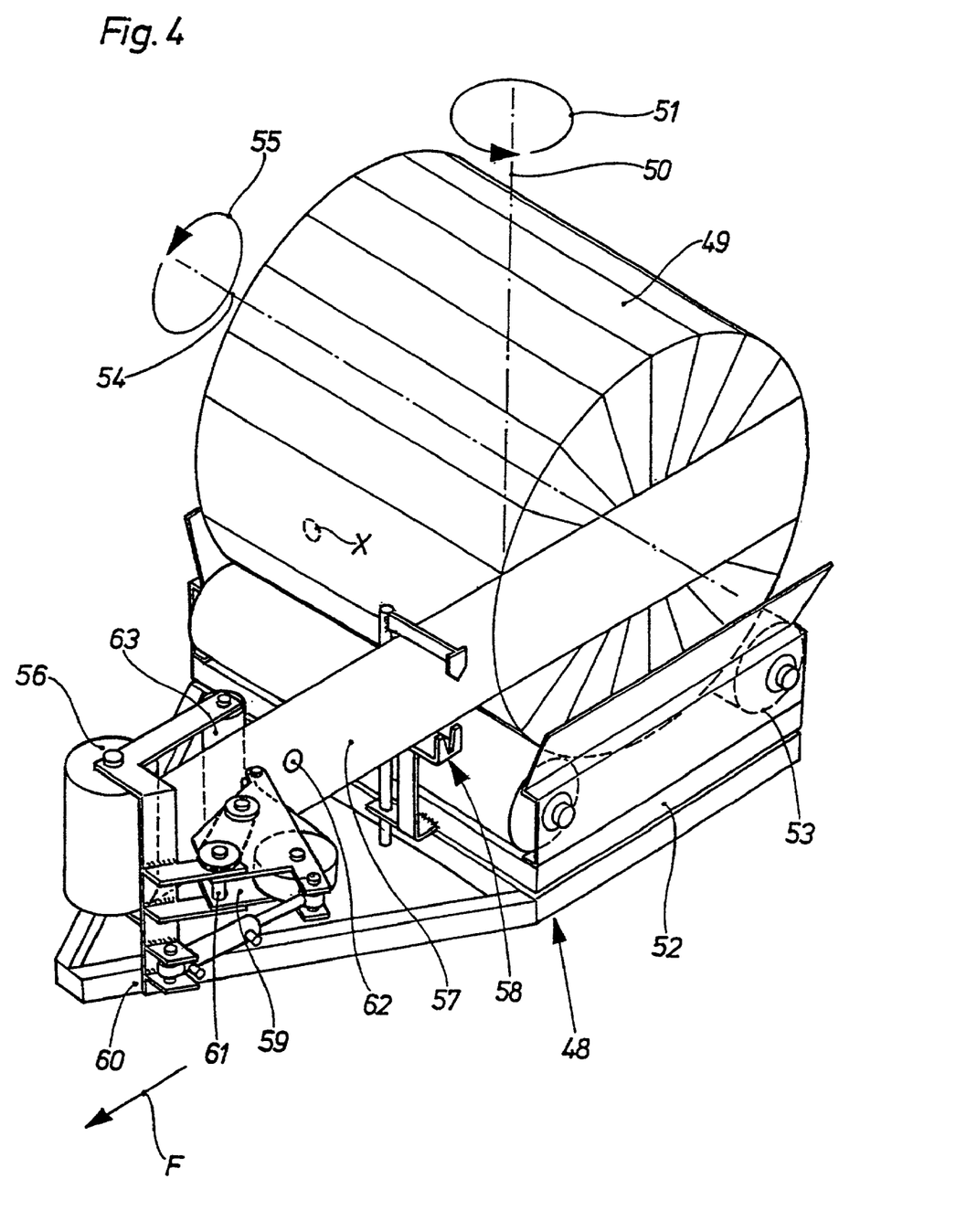
FIGS. 4 and 5, respectively, disclose other embodiments for identifying a bale wrapped with film in a wrapping table device in perspective views.

In the embodiment in accordance with FIG. 4, a wrapping table device 48 is shown for wrapping a bale 49 of harvested agricultural produce, with the device pulled during the operation of a tractor (not shown) in the driving direction F. It basically consists of a wrapping table 52, which can be driven around a vertical axis 50 in the rotational direction 51 together with drivable rollers 53, which are arranged at a distance from each other and simultaneously move bale 49 of harvested agricultural produce resting on it around a horizontal bale center line 54 in the rotational direction 55, wherein bale 49 pulls film 57 off a film dispensing reel 56 over a stretching device (not shown) and wraps it around itself. On the wrapping table 52 a cutting-and-clamping deice 58 is arranged. With regard to the design and function thereof, reference is made to EP 0 367 529 B1. As shown in FIG. 4, a label dispensing unit 59 is no longer arranged in the path of travel of bale 49, but in the area of path of travel of film 57 between the film dispensing reel 56 and rotating wrapping table 52. Label dispensing unit 59 corresponds to one the of FIG. 2 and is arranged in an articulating manner around a shaft 61 that is fastened to the stand 60. Inasmuch as the free film area would move when pressing on the label dispensing unit 59, a freely rotating counter-pressure roller 63, which is seated on stand 60 presses against the film interior exactly opposite the desired area of attachment of label 62. For placing label 62 in the desired location on bale 49 only the distance between the bale's center line 54 and the attachment location of the label 62 must be established. After attaching label 62 on film 57, the labeled film section is pulled around bale 49 through further rotation of bale 49, thus allowing label 62 to rest in the desired location X on bale 49. In a preferred version, the distance of label dispensing unit 59 can be changed in the feeding direction of the film 57 in order to place a label in various locations on bale 49.

Figure 5:
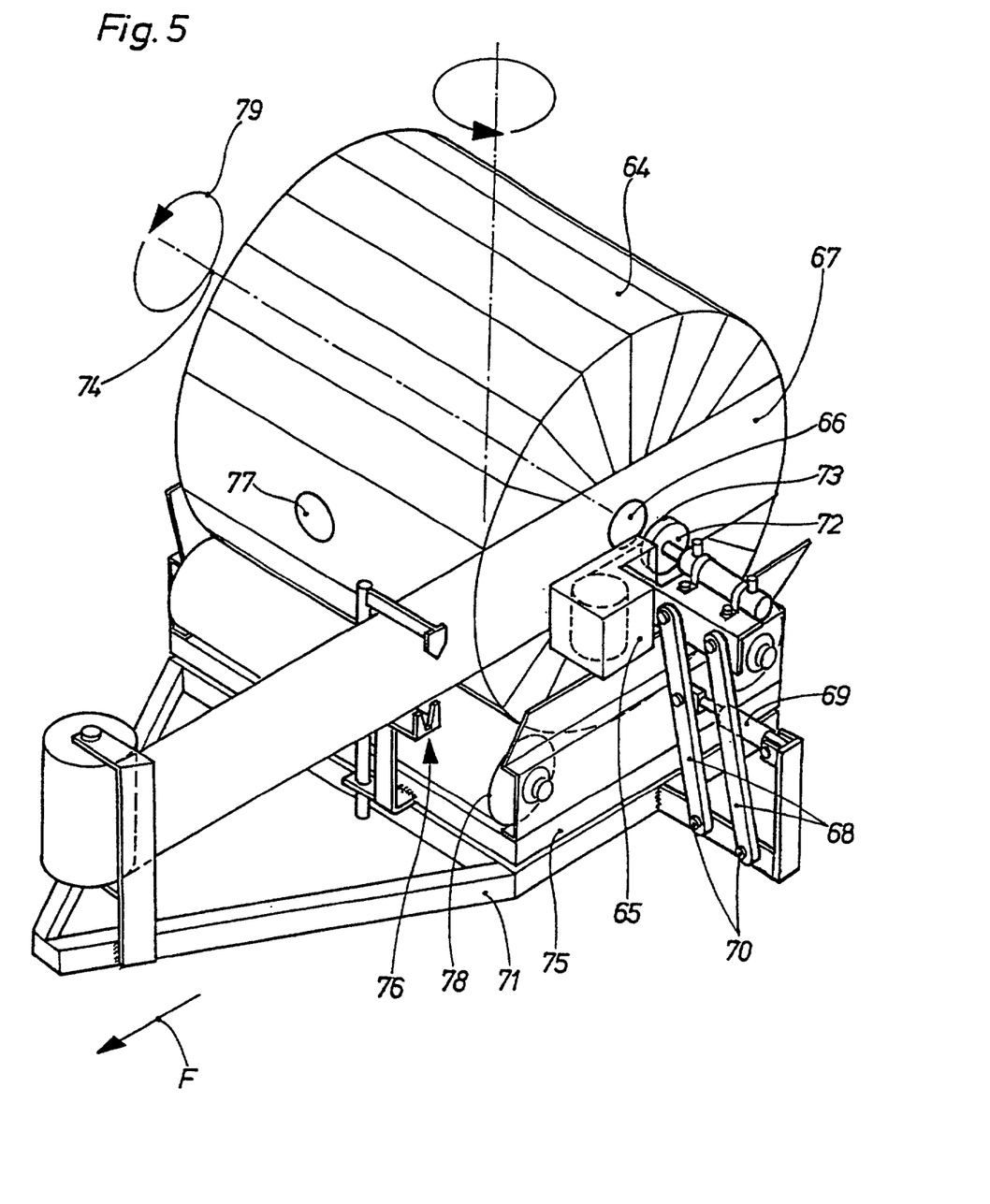

The device for wrapping a bale 64 of harvested agricultural produce shown in FIG. 5 corresponds to the device in accordance with FIG. 4; however a label dispensing unit 65 has been arranged in such a way that label 66 is attached directly on the film 67 resting against bale 64. Label dispensing unit 65 is seated on stand 71 in an articulating manner around the axis 70 through a parallel guiding element 68 and hydraulic piston and cylinder member 69 roughly in the horizontal longitudinal median plane and is equipped, instead of with a pressing roller with a hydraulically or pneumatically actuated pressing stamp 72, with a vacuum-and-blow head 73 which can be moved in a coaxial direction to the rotational axis 74 of bale 64 for pressing label 66 against the bale front. Depending on the position of wrapping table 75, a label 66 can be selectively placed on the bale front, as shown in FIG. 5, or on the bale circumference in the case of a resting bale 64.

In FIG. 5, bale 64 of harvested agricultural produce is wrapped with film 67 until the cuffing-and-clamping process. The bale's center line 75 is aligned coaxially to the direction of movement of vacuum-and-blow head 73. For the purpose of labeling bale 64, label 66 is initially fed to vacuum-and-blow head 73, subjected to suction and pressed on film 67 surrounding bale 64 while bale 64 is resting. For detaching label 66 from vacuum-and-blow head 73, the device is switched to blowing air, and label dispensing unit 65 is swiveled back into the position shown in FIG. 5, in which label dispensing unit 65 is outside the path of travel of wrapping table 75.

It is basically also feasible to arrange an appropriate label dispensing unit with a pivoting vacuum-and blow head on wrapping table 75 and to attach a label during the film wrapping process, i.e. while the wrapping table and the base are turning. With this process it should be noted that attachment of the label occurs on the bale of harvested agricultural produce beneath the film bottom edge of the last layer of film that was pulled off or that the label dispensing unit must be moved out of the path of travel of the film if additional wrapping processes are supposed to take place.

Alternatively a label dispensing unit (not shown) can also be arranged next to a cutting-and-clamping device 76 for the film on wrapping table 75 in order to attach a label 77 on the circumference side of the bale 64 on a film section that will not be wrapped any more. The advantage here is that label 77 is automatically pressed on the film surface again by rollers 78 while the bale continues to rotate in the rotational direction 79.

Figure 6:
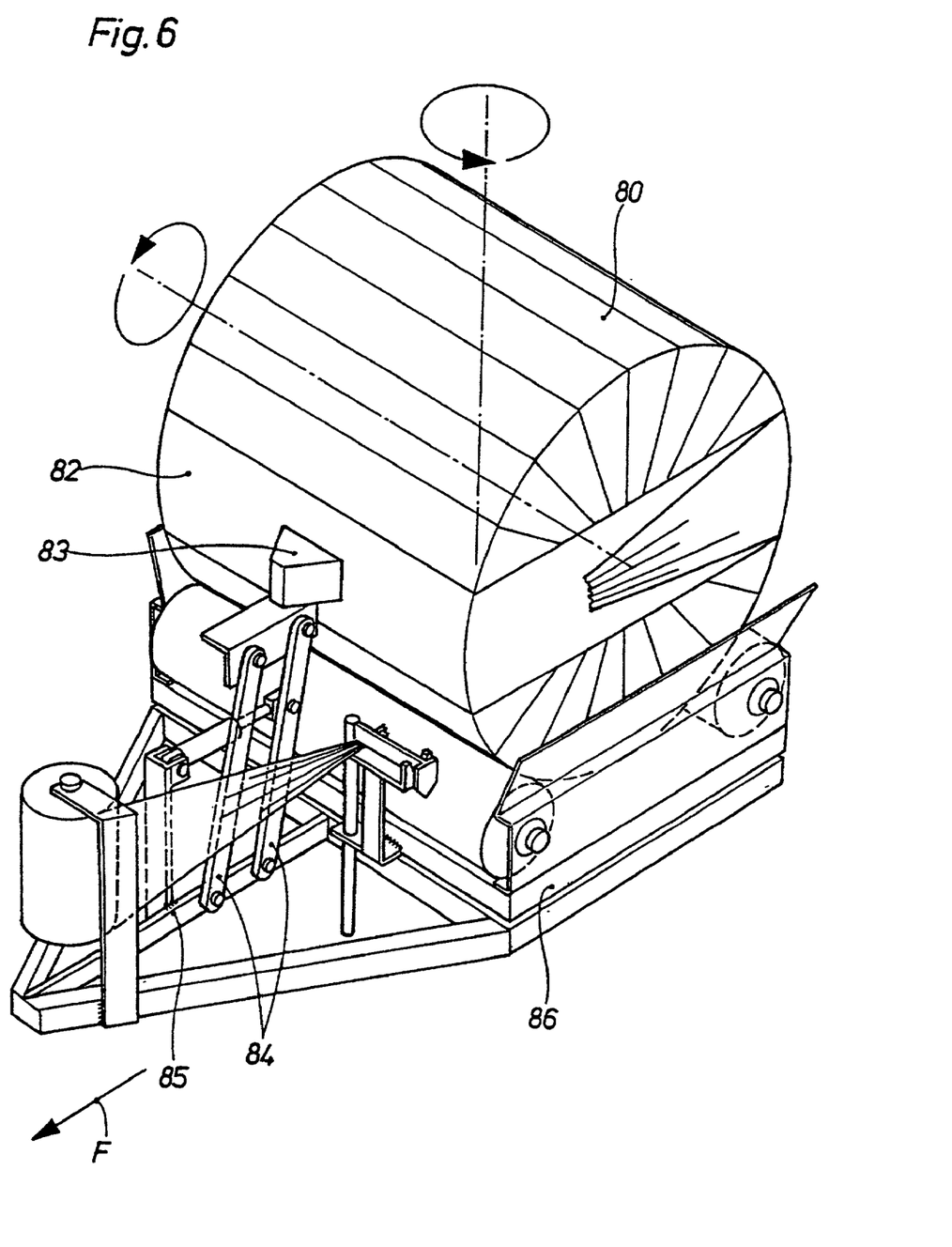
FIG. 6 shows another embodiment for imprinting a bale wrapped in film on a wrapping table device in perspective view.

FIG. 6 shows a device for wrapping a bale 80 of harvested agricultural produce in accordance with FIGS. 4 and 5. However the film is imprinted with an ink-jet printer after the cutting-and-clamping process of the film performed by a cutting-and-clamping device 81 has occurred For the purpose of identifying the bale 80, in this example the film 82 is directly imprinted with an ink-jet printer 83. The ink-jet printer 83 is seated in an articulating manner on the stand 85 with a parallel guiding element 84. After the printing process, the ink-jet printer 83 is moved out of the circular path of the wrapping table 86. When the bale is not rotating, the ink-jet printer is activated, for example, by actuating the cutting-and-clamping device 81 or by triggering the tilt function of wrapping table 86, after the ink-jet printer has been arranged at the correct distance relative to the bale surface by a hydraulic piston and cylinder means. Instead of the ink-jet printer, simple printing stamps or similar printing means can also be utilized.

Although I have disclosed the preferred embodiments of my invention, it is to be understood that it is capable of other adaptations and modifications within the scope of the following claims.

The invention claimed is:

1. A method of wrapping a bale composed of an agricultural product which comprises the steps of completely wrapping said bale with a film so that the interior of said bale is substantially in continuous contact with the entire surface of said bale, and applying identifying information to said film which relates uniquely to the identity of said bale including the manner said bale is wrapped with said film, said film being cut in a cutting step which takes place after said identifying information has been applied to said film, said applying of said identifying information to said film being coordinated with the step of cutting said film.

2. A method of wrapping a bale composed of an agricultural product which comprises the steps of completely wrapping said bale with a film so that the interior of said film is substantially in continuous contact with the entire surface of said bale, and applying identifying information to said film which relates uniquely to the identity of said bale including the manner said bale is wrapped with said film, said identifying information comprising electronic identification with which said bale can be located which is sensitive to a satellite navigation system.

3. A method in accordance with claim 2, wherein said satellite navigation system comprises GPS.

4. A method in accordance with claim 2, wherein said satellite navigation system comprises DGPS.

5. A method of wrapping a bale composed of an agricultural product consisting essentially of cut crop which comprises the steps of entirely wrapping said bale with a film so that said bale is surrounded on all of its sides by said film and the entire interior of said film is substantially completely in continuous contact with substantially the entire outer surface of said cut crop in said bale, and applying identifying information to said film which relates uniquely to the identity of said bale including the manner that said bale is wrapped with said film, said identifying information being applied to said film while said bale is relatively at rest, said film being substantially transparent, said identifying information being applied to said film in such a manner that it is subsequently covered by said film while still being detectable through said film.

6. A method of wrapping a bale composed of an agricultural product consisting essentially of cut crop which comprises the steps of entirely wrapping said bale with a film so that said bale is surrounded on all of its sides by said film and the entire interior of said film is substantially completely in continuous contact with substantially the entire outer surface of said cut crop in said bale, and applying identifying information to said film which relates uniquely to the identity of said bale including the manner that said bale is wrapped with said film, said identifying information being controlled remotely and recognized by electronic data recording systems.

7. A method of wrapping a bale composed of an agricultural product consisting essentially of cut crop which comprises the steps of entirely wrapping said bale with a film so that said bale is surrounded on all sides by said film and the entire interior of said film is substantially completely in continuous contact with substantially the entire outer surface of said cut crop in said bale, and applying identifying information to said film which relates uniquely to the identity of said bale including the manner that said bale is wrapped with said film, said identifying information including information of the location of said bale as determined by a satellite navigation system.

8. A device for wrapping a bale of harvested agricultural produce which comprises wrapping means for wrapping at least one layer of a film of material completely around said bale with said film having its interior layer in direct contact with substantially the entire outer surface of said bale and label applying means for automatically applying a label to said film comprising identifying information relating to said bale, said wrapping means comprising a rotary arm which is arranged on said label applying means, said rotary arm moving in a circle around said bale.

9. A device for wrapping a bale of harvested agricultural produce which comprises wrapping means for wrapping at least one layer of a film of material completely around said bale with said film having its interior layer in direct contact with substantially the entire outer surface of said bale and label applying means for automatically applying a label to said film comprising identifying information relating to said bale, said wrapping means comprising a rotary wrapping table, said label applying means being arranged on said rotating wrapping table.

10. A device in accordance with claim 9, wherein said wrapping means comprises a film stretching device, said label applying means being arranged to apply said label on said film that has been stretched by said film stretching device.

11. A device for wrapping a bale of harvested agricultural produce which comprises wrapping means for wrapping at least one layer of a film of material completely around said bale with said film having its interior layer in direct contact with substantially the entire outer surface of said bale and label applying means for automatically applying a label to said film comprising identifying information relating to said bale, and detaching means for detaching said label from said film by rotating said bale.

12. A device for wrapping a bale of harvested agricultural produce which comprises wrapping means for wrapping at least one layer of a film of material completely around said bale with said film having its interior layer in direct contact with substantially the entire outer surface of said bale and label applying means for automatically applying a label to said film comprising identifying information relating to said bale, and a tape containing a plurality of said labels which is moved into contact with said film by said label applying means.

13. A device in accordance with claim 12, wherein said label applying means comprises mechanical means for moving said tape.

14. A device in accordance with claim 12, wherein said label applying means comprises an electric energized means for moving said tape.

15. A device in accordance with claim 12, wherein said label applying means comprises hydraulic means for moving said tape.

16. A device in accordance with claim 12, wherein said label applying means comprises pneumatically powered means for moving said tape.

17. A device in accordance with claim 12, wherein said label applying means comprises a power-take-off means of a tractor for moving said tape.

* * * * *